(12) United States Patent
Kawatsu

(10) Patent No.: US 10,338,511 B2
(45) Date of Patent: Jul. 2, 2019

(54) READING APPARATUS AND IMAGE FORMING APPARATUS WITH GUIDE MEMBER TO GUIDE SHEET FROM FIRST FEEDING PATH TO SECOND FEEDING PATH

(71) Applicant: KONICA MINOLTA, INC., Chiyoda-ku Tokyo (JP)

(72) Inventor: Kenji Kawatsu, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/937,289

(22) Filed: Mar. 27, 2018

(65) Prior Publication Data

US 2018/0284677 A1 Oct. 4, 2018

(30) Foreign Application Priority Data

Mar. 29, 2017 (JP) .................................. 2017-064095

(51) Int. Cl.
| | |
|---|---|
| *G03G 15/00* | (2006.01) |
| *B65H 5/06* | (2006.01) |
| *B65H 5/36* | (2006.01) |
| *H04N 1/12* | (2006.01) |
| *H04N 1/60* | (2006.01) |

(52) U.S. Cl.
CPC ......... *G03G 15/5062* (2013.01); *B65H 5/062* (2013.01); *B65H 5/36* (2013.01); *G03G 15/6573* (2013.01); *H04N 1/123* (2013.01); *H04N 1/1215* (2013.01); *H04N 1/1225* (2013.01); *H04N 1/60* (2013.01); *G03G 2215/00679* (2013.01)

(58) Field of Classification Search
CPC .................................................. G03G 15/5062
USPC ........................................................... 399/15
See application file for complete search history.

(56) References Cited

U.S. PATENT DOCUMENTS 8,626,004 B2 * 1/2014 Ito ...................... G03G 15/0189
399/15

FOREIGN PATENT DOCUMENTS

JP 2015220471 A 12/2015

* cited by examiner

*Primary Examiner* — Quana Grainger
(74) *Attorney, Agent, or Firm* — Cantor Colburn LLP

(57) ABSTRACT

A reading apparatus includes: a reader that reads an image formed on a sheet; an opposed reading member provided opposite to the reader; a first feeding path that feeds a sheet on an upstream of the reader in a sheet feeding direction; a second feeding path that is continuous to the first feeding path and feeds a sheet between the reader and the opposed reading member; a pair of feeding rollers that feeds a sheet on the first feeding path to the second feeding path; a guide member that guides a sheet fed from the first feeding path to the second feeding path; and a roller that is arranged on the second feeding path and is rotatably driven, wherein the first feeding path and the second feeding path form a feeding path bent, a downstream end of the guide member is positioned in a first region.

10 Claims, 10 Drawing Sheets

READING APPARATUS AND IMAGE FORMING APPARATUS WITH GUIDE MEMBER TO GUIDE SHEET FROM FIRST FEEDING PATH TO SECOND FEEDING PATH

CROSS-REFERENCE TO RELATED APPLICATIONS

The present invention claims priority under 35 U.S.C. § 119 to Japanese patent Application No. 2017-064095, filed on Mar. 29, 2017, the entire disclosure of which is incorporated herein by reference.

BACKGROUND

Technological Field

The present invention relates to a reading apparatus and an image forming apparatus.

Description of the Related Art

There has been conventionally known an image forming apparatus including an image former in electrophotographic system that gives and fixes a toner on a recording medium such as sheet thereby to form an image, and a reading apparatus that reads the image formed on the recording medium in the image former. In the image forming apparatus, a predetermined identification marker is formed on a recording medium by the image former and the identification marker is read by the reading apparatus, and thus the reading result can be used for various applications. For example, the identification marker is read by the reading apparatus and the position of the identification marker on the recording medium is calculated, thereby obtaining information on the position of the image formed by the image former. Further, the information is fed back to the image former to correct the image forming position by the image former, thereby forming the image at an appropriate position on a recording medium.

A conventional reading apparatus includes a reader that is provided with an optical sensor such as CCD and reads an image, and an opposed reading member provided opposite to the reader. A sheet needs to be fed at a constant height at a reading position between the reader and the opposed reading member in order to accurately read an image. Thus, JP 2015-220471 A discloses a technique in which a path for feeding a sheet to a reading position is bent to press the sheet onto an opposed reading member. With this arrangement, it is possible to restrict a variation in sheet height and to improve accuracy of reading.

Further, in order to prevent a sheet from being damaged due to being pressed onto the opposed reading member, an anti-damage roller is provided on the opposed reading member, and a position contacting with the roller is assumed as reference sheet height.

While the accuracy of reading an image can be enhanced with the above configuration, a sheet feeding speed may vary due to a collision of the tip end of a sheet on a member along the feeding path such as the opposed reading member or the anti-damage roller when the sheet enters the bent part.

In order to prevent this, it is proposed to provide a guide member along the feeding path on the upstream of the reading apparatus. That is, the tip end of a sheet is raised up to the same height as the bent part and guided to the bent part by the guide member, and the opposed reading member feeds the sheet while friction with the sheet is alleviated by the anti-damage roller on the opposed reading member.

However, if the guide member continues to contact with a sheet, there arise another problem that a sheet and an image formed on the sheet are damaged.

SUMMARY

The present invention has been made in terms of the above problems, and an object thereof is to provide a reading apparatus and an image forming apparatus capable of keeping a constant sheet feeding speed and preventing a sheet and an image formed on the sheet from being damaged.

To achieve the abovementioned object, according to an aspect of the present invention, a reading apparatus reflecting one aspect of the present invention comprises:

a reader that reads an image formed on a sheet;

an opposed reading member that is provided opposite to the reader;

a first feeding path that feeds a sheet on an upstream of the reader in a sheet feeding direction;

a second feeding path that is continuous to the first feeding path and feeds a sheet between the reader and the opposed reading member;

a pair of feeding rollers that feeds a sheet on the first feeding path to the second feeding path;

a guide member that guides a sheet fed from the first feeding path to the second feeding path, from the opposed reading member side; and a roller that is arranged on the second feeding path and is rotatably driven in a sheet feeding direction due to contact with a sheet, wherein the first feeding path and the second feeding path form a feeding path bent due to the different sheet feeding directions of the first feeding path and the second feeding path, a downstream end of the guide member in a sheet feeding direction is positioned in a first region surrounded by a line connecting a nip part of the pair of feeding rollers and a center of the roller, a tangential line closer to a sheet of the roller, the roller parallel with a sheet feeding direction of the second feeding path, and the outer periphery of the roller.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

A first embodiment to which the present invention is applied will be described below with reference to the drawings. The following description assumes that the horizontal direction in FIG. 1 is X direction, the vertical direction is Z direction, and the direction orthogonal to the X direction and the Z direction, or the front-back direction, is Y direction.

<Configuration of Image Forming Apparatus>

Figure 1:
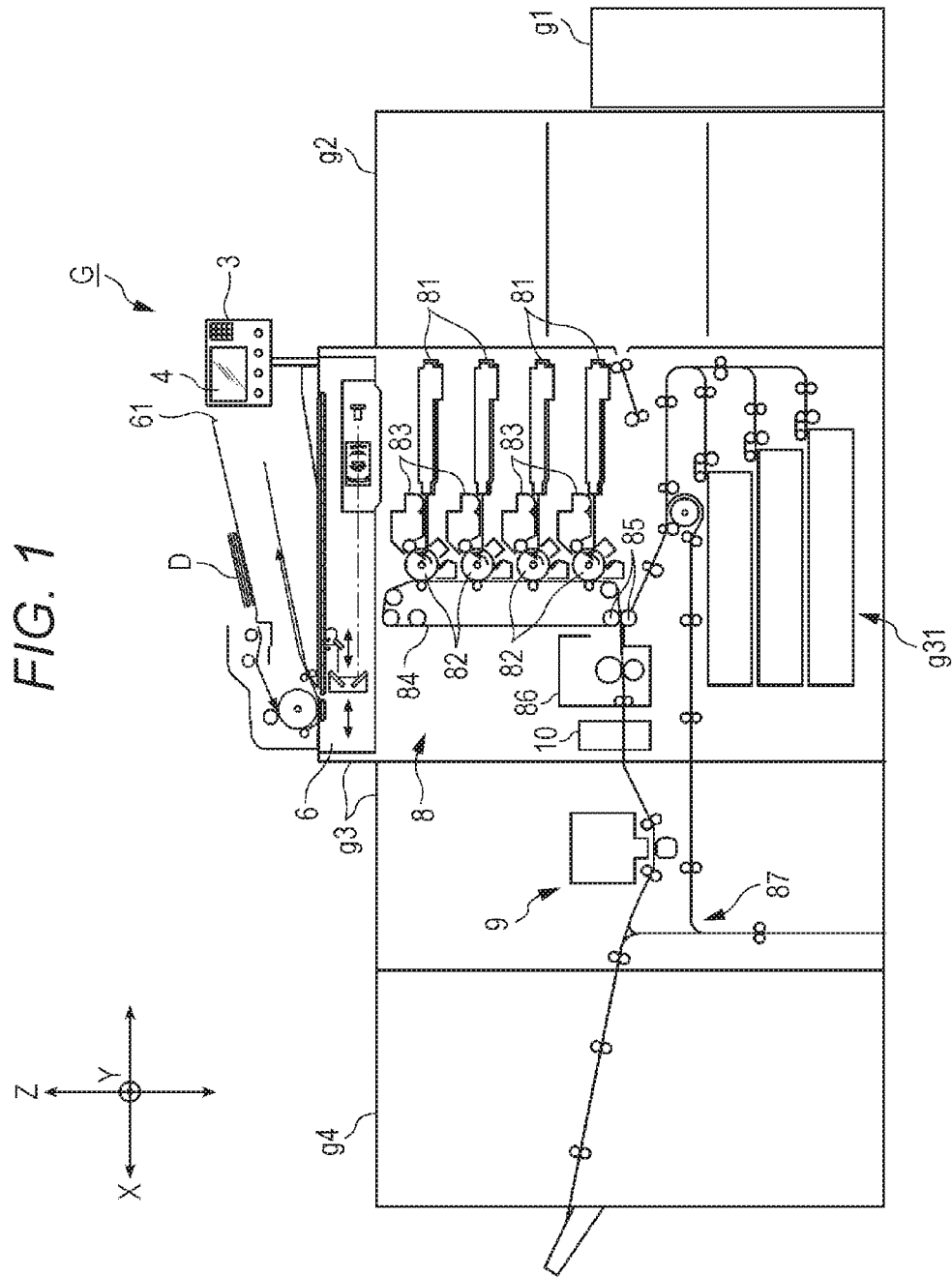
FIG. 1 is a diagram illustrating a schematic configuration of an image forming apparatus to which the present invention is applied.

An image forming apparatus G includes a print controller g1, a sheet feeding unit g2, a main body unit g3, and a postprocessor g4 as illustrated in FIG. 1.

The print controller g1 receives page description language (PDL) data from a computer terminal on a network, and rasterizes the PDL data thereby to generate image data in the bitmap format.

The print controller g1 generates image data for each color of cyan (C), magenta (M), yellow (Y), and black (K), and outputs the same to the main body unit g3.

The sheet feeding unit g2 includes a plurality of large-capacity sheet trays.

The sheet feeding unit g2 feeds a sheet from a sheet tray designated by the main body unit g3 to the main body unit g3.

The main body unit g3 includes an operation unit 3, a display 4, an automatic document feeder 61, a scanner 6, an image former 8, a sheet tray g31, a reading apparatus 9, and a reforming unit 10.

The main body unit g3 forms an image on a sheet by the image former 8 on the basis of the image data obtained by reading a document sheet D with the scanner 6 and the image data generated by the print controller g1. The main body unit g3 feeds the sheet forming the image thereon to the postprocessor g4.

The postprocessor g4 post-processes and discharges the sheet fed from the main body unit g3. A series of post-processing includes the stapling processing, the punching processing, the folding processing, and the binding processing, for example. The series of post-processing is not essential, and the postprocessor g4 performs a post-processing only when being instructed by the main body unit g3. When a post-processing is not instructed, the postprocessor g4 discharges the fed sheet as it is.

Figure 2:
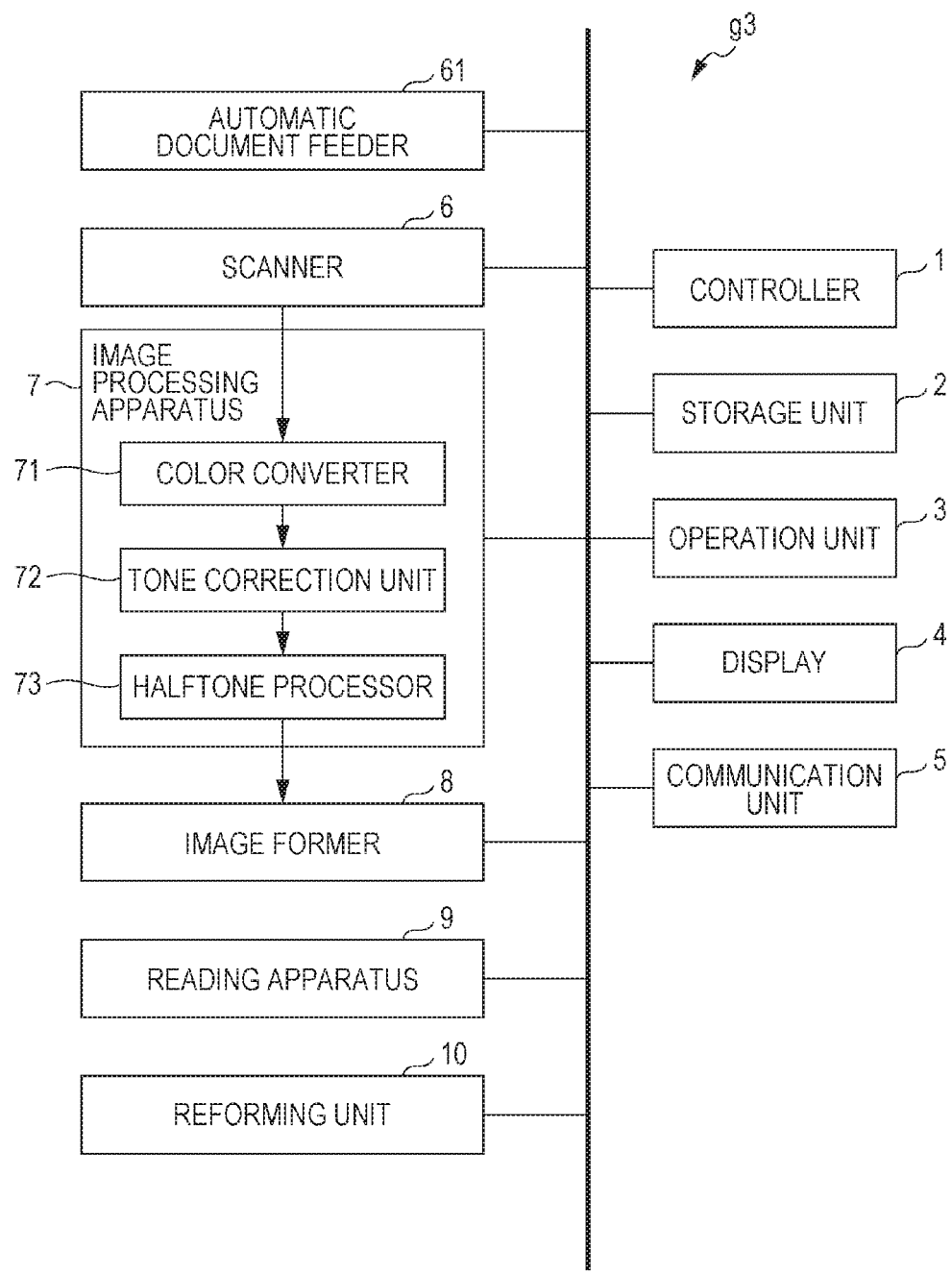
FIG. 2 is a block diagram illustrating a functional configuration of the image forming apparatus.

The main body unit g3 includes a controller 1, a storage unit 2, the operation unit 3, the display 4, a communication unit 5, the automatic document feeder 61, the scanner 6, an image processing apparatus 7, the image former 8, the reading apparatus 9, and the reforming unit 10 as illustrated in FIG. 2.

The controller 1 includes a CPU, a RAM, and the like. The controller 1 reads a program stored in the storage unit 2 and controls each unit in the image forming apparatus G according to the program.

For example, the controller 1 causes the sheet feeding unit g2 or the sheet tray g31 to feed a sheet according to the job setting. Further, the controller 1 causes the image processing apparatus 7 to correct and process image data, and causes the image former 8 to form an image. If the job setting includes a post-processing setting, the controller 1 instructs the postprocessor g4 to perform the post-processing.

The storage unit 2 stores programs and files readable by the controller 1. The storage unit 2 may be a storage medium such as hard disc or read only memory (ROM).

The operation unit 3 includes operation keys, or a touch panel integral with the display 4, and outputs an operation signal depending on its operation to the controller 1. A user can input instructions to set a job, to change the processing contents, and the like via the operation unit 3.

The display 4 may be a liquid crystal display (LCD), and displays an operation screen in response to an instruction of the controller 1.

The communication unit 5 makes communication with a computer on a network, such as server or other image forming apparatus, in response to an instruction of the controller 1.

The automatic document feeder 61 includes a placement tray on which a document sheet D is placed, a mechanism for feeding the document sheet D, and a feeding roller, and feeds the document sheet D to a predetermined feeding path.

The scanner 6 includes optical systems such as light source and reflecting mirror, reads the document sheet D fed in the predetermined feeding path or an image of the document sheet D placed on the platen glass, generates image data for each color of read (R), green (G), and blue (B), and outputs the image data to the image processing apparatus 7.

The image processing apparatus 7 corrects the image data input from the scanner 6 or the print controller g1, and performs the image processing thereon, and outputs the processed image data to the image former 8.

The image processing apparatus 7 includes a color converter 71, a tone correction unit 72, and a halftone processor 73 as illustrated in FIG. 2.

The color converter 71 performs the color conversion processing on the image data of the respective colors R, G, and B output from the scanner 6, and outputs the image data of the respective colors C, M, Y, and K.

The color converter 71 can perform the color conversion processing on the image data of the respective colors C, M, Y, and K output from the print controller g1 for color correction, and can output the color-corrected image data of the respective colors C, M, Y, and K.

The color converter 71 uses a LUT in which the tone values of the respective color-converted colors C, M, Y, and K are defined for the tone values of the respective colors R, G; and B during the color conversion processing. The color converter 71 uses the LUT in which the tone values of the respective color-corrected C, M, Y, and K are defined for the tone values of the respective colors C, M, Y, and K during color correction.

The tone correction unit 72 corrects the tone of the image data output from the color converter 71 or the print controller g1.

The tone correction unit 72 uses the LUT in which the correction values corresponding to the respective tone values are defined such that the tone characteristics of the image match target tone characteristics during tone correction. The tone correction unit 72 obtains the correction values corresponding to the tone values of the pixels of the image data from the LUT for tone correction, and outputs the image data made of the correction values.

The halftone processor 73 performs the halftone processing on the image data output from the tone correction unit 72. The halftone processing is a screen processing using a dither matrix, an error spreading processing, or the like.

The halftone processor 73 outputs the image data subjected to the halftone processing to the image former 8.

The image former 8 forms an image on a sheet on the basis of the image data output from the image processing apparatus 7.

The image former 8 includes four sets of an exposure unit 81, a photosensitive body 82, and a development unit 83 for the colors C, M, Y, and K, respectively, as illustrated in FIG. 1. The image former 8 includes an intermediate transfer belt 84, a secondary transfer roller 85, a fixing apparatus 86, and an inversion mechanism 87.

The exposure unit 81 includes a laser diode (LD) as light emitting device. The exposure unit 81 drives the LD on the basis of the image data, and irradiates and exposes a laser light on the photosensitive body 82 to be charged. The development unit 83 supplies a toner onto the photosensitive body 82 by a development roller to be charged, and develops an electrostatic latent image formed on the photosensitive body 82 by exposure.

The images formed by the toners of the respective colors on the four photosensitive bodies 82 in this way are sequentially overlapped and transferred onto the intermediate transfer belt 84 from each photosensitive body 82. Thereby, a color image is formed on the intermediate transfer belt 84. The intermediate transfer belt 84 is an endless belt wound on a plurality of rollers, and rotates along with rotation of each roller.

The secondary transfer roller 85 transfers the color image on the intermediate transfer belt 84 onto a sheet supplied from the sheet feeding unit g2 or the sheet tray g31. The fixing apparatus 86 heats and pressurizes the transferred sheet, and performs the fixing processing on it.

When forming an image on both side of a sheet, the image former 8 inverts the sides of the sheet by the inversion mechanism 87, and forms an image on the other side. The inversion mechanism 87 has a feeding path that inverts the sides of a sheet passing therethrough and feeds the sheet to the transfer position by the secondary transfer roller 85 again.

Figure 3A:
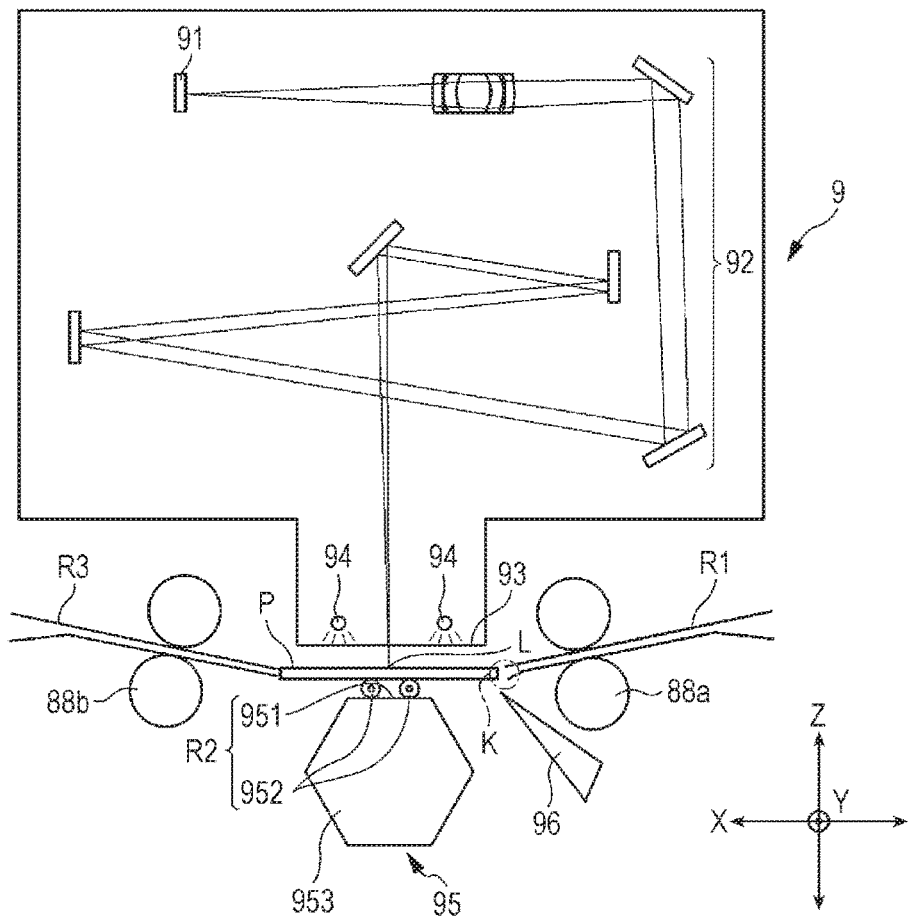
FIG. 3A and FIG. 3B are diagrams illustrating a schematic configuration of a reader according to a first embodiment.
Figure 3B:
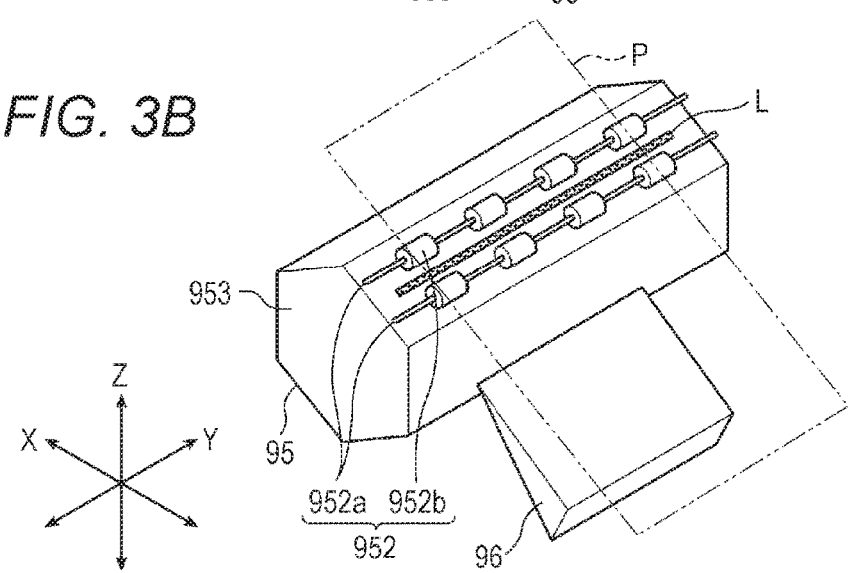

FIG. 3A and FIG. 3B are schematic diagrams illustrating a configuration of an opposed reading member 95, where FIG. 3A is a schematic diagram when the reading apparatus 9 is viewed in the Y direction and FIG. 3B is a schematic perspective view of the opposed reading member 95 and a guide member 96.

The reading apparatus 9 reads an image formed on a sheet fed from an upstream feeding path R1 (first feeding path) provided on the upstream of the reading apparatus 9 in the feeding direction to a reading feeding path R2 (second feeding path) as illustrated in FIG. 1 and FIG. 3A. The sheet from which the image is read by the reading apparatus 9 is fed from the reading feeding path R2 to the postprocessor g4 via a downstream feeding path R3 provided on the downstream of the reading apparatus 9 in the feeding direction. When the reading apparatus 9 reads an image, a sheet is fed by a plurality of feeding rollers (such as upstream feeding rollers 88a and downstream feeding rollers 88b) provided along the feeding path such that the sheet passes through a reading position L at a predetermined speed.

The reading apparatus 9 includes a charge coupled device (CCD) 91 as an optical sensor that reads an image formed on a sheet at the predetermined reading position L, an optical system 92 that guides the image at the reading position L to the CCD 91, a reading face 93 opposite to the opposed reading member 95, a light emitting diode (LED) light source 94 that irradiates the reading position L, the opposed reading member 95, and the guide member 96.

The CCD 91 is a color line sensor capable of reading the range at the full width of a sheet in its width direction (Y direction).

The optical system 92 includes a plurality of mirrors and a plurality of lenses, guides an image at the reading position L, which is obtained via the reading face 93 made of glass, to the CCD 91.

The CCD 91, the optical system 92, the reading face 93, and the LED light source 94 realizes a function as reader.

The opposed reading member 95 is provided opposite to the reading face 93 of the reading apparatus 9. As illustrated in FIG. 3A, the opposed reading member 95 has a main body 953, and an opposed reading face 951 arrange on the side of the main body 953.

The opposed reading face 951 has a pair of rollers 952 arranged, on its surface, spaced at a predetermined interval in the sheet feeding direction. As illustrated in FIG. 3B, the rollers 952 has shafts 952a extending in the Y direction, and roller main bodies 952b provided on the shafts 952a spaced at predetermined intervals, which are provided to be rotatably driven while contacting with a sheet P. The ends of the rollers 952 in the Y direction are supported by support members (not illustrated).

The opposed reading face 951 is arranged opposite to the reading face 93, and a sheet P passes thereon. The reading feeding path R2 is formed of the opposed reading face 951 and the rollers 952.

The CCD 91 reads a part included at the reading position L in a predetermined rectangular shape extending in the Y direction illustrated in FIG. 3B in an opposed reading face 951 and a sheet P on the opposed reading face 951. The reading and the feeding of a sheet P in the X direction are alternately repeated so that the CCD 91 reads the range including the entire face of the sheet P. The reading apparatus 9 converts an analog signal output from each imaging device line of the CCD 91 into a digital signal, and generates and outputs imaging data including the pixel data of the respective colors R, G, and B to the controller 1.

The upstream feeding path R1, the reading feeding path R2, and the downstream feeding path R3 are continuously provided, and have different feeding angles, respectively. Specifically, the upstream feeding path R1 is provided to be downwardly tilted relative to the horizontal direction, and can apply a downward press force on a sheet fed to the reading feeding path R2. The reading feeding path R2 is provided in the horizontal direction. The downstream feeding path R3 is provided to be upwardly tilted relative to the horizontal direction, and can apply an upward press force on a sheet fed from the reading feeding path R2.

The guide member 96 is a metallic plate-shaped member which is arranged closer to the opposed reading member 95 on the upstream of the reading feeding path R2 in the Z direction and extends in the Y direction as illustrated in FIG. 3A and FIG. 3B. The guide member 96 guides the backside of a sheet passing through the bent part K between the upstream feeding path R1 and the reading feeding path R2 from the opposed reading member 95 side. A detailed operation mechanism of the guide member 96 will be described below.

The reading apparatus 9 has the above configuration, and can sequentially read images formed on a sheet over the full width of the sheet passing through the reading position L.

<Sheet Feeding Mechanism in Reader>

A sheet feeding mechanism according to the first embodiment will be described below with reference to the drawings.

As described above, as illustrated in FIG. 3A and FIG. 3B, the upstream feeding path R1 is provided to be downwardly tilted relative to the horizontal direction, and can apply a downward press force on a sheet fed to the reading feeding path R2. A sheet P is fed via the bent part K between the upstream feeding path R1 and the reading feeding path R2 to be pressed onto the reading feeding path R2, and a variation in height of the sheet on the reading feeding path R2 is restricted. That is, the positions contacting with the rollers 952 are a reference sheet height.

At this time, the rollers 952 rotate while contacting with a sheet P, thereby preventing a damage from occurring on the sheet P due to being pressed to an opposed reading face 951.

The rollers 952 can restrict a damage from occurring in the reading feeding path R2, but the sheet feeding speed may vary due to an impact when the tip end of a sheet P enters the reading feeding path R2. In order to restrict a variation in sheet feeding speed, the guide member 96 is provided on the upstream of the reading feeding path R2 according to the present embodiment as illustrated in FIG. 3A and FIG. 3B. Thereby, the tip end of a sheet does not collide with the rollers 952, and the sheet can be smoothly fed.

However, if the guide member 96 keeps contacting with the backside of a sheet, the sheet itself can be damaged, and if an image is formed on the backside of the sheet, the image can be damaged. Thus, the tip end (downstream end) of the guide member 96 needs to be arranged to contact with only the tip end of a sheet P.

Figure 4A:
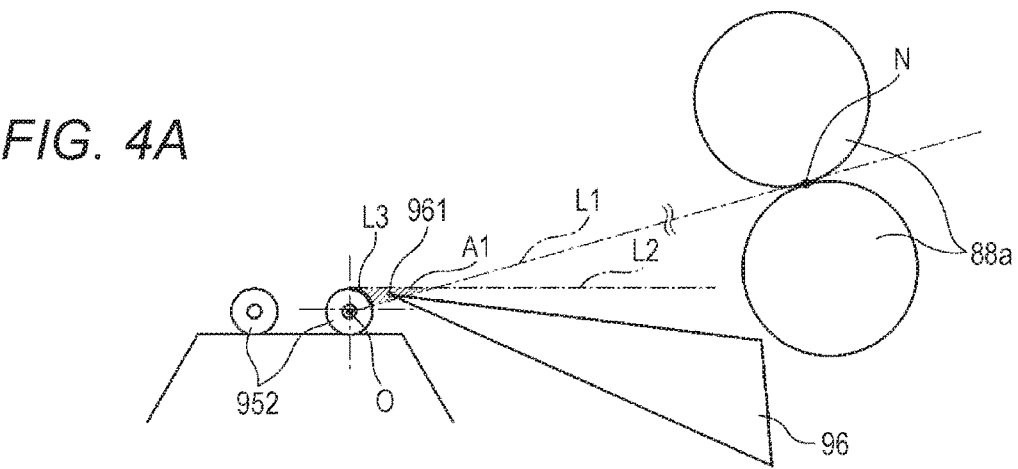
FIG. 4A to FIG. 4C are diagrams for explaining a position of the tip end of a guide and a sheet feeding state according to the first embodiment.
Figure 4B:
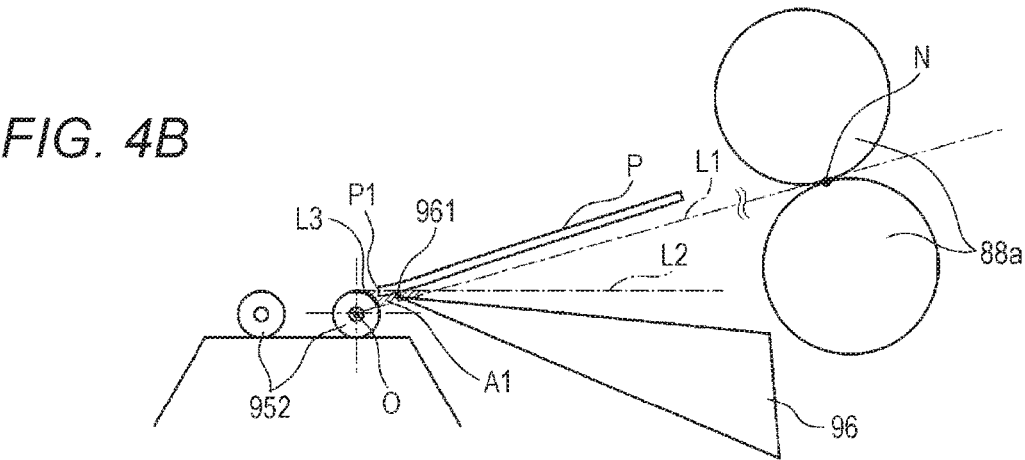
Figure 4C:
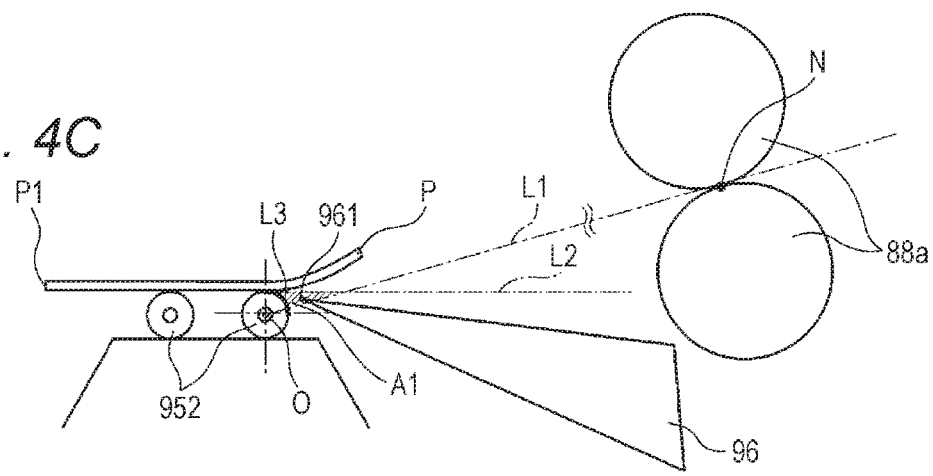

FIG. 4A to FIG. 4C illustrate a position of the guide member 96 according to the present embodiment.

As illustrated in FIG. 4A, the tip end 961 of the guide member 96 is positioned in a first region A1 surrounded by a line (first line L1) connecting the nip part N of the upstream feeding rollers 88a and the center O of a roller 952, a tangential line (second line L2) of the roller 952 parallel with the reading feeding face 953a, and the outer periphery L3 of the roller 952.

This will be described with reference to FIG. 4B and FIG. 4C. As illustrated in FIG. 4B, when the tip end P1 of a sheet P enters the reading feeding path R2, the tip end P1 of the sheet P progresses while downwardly tilting relative to the horizontal direction, but is raised upward by the tip end 961 of the guide member 96. Thereby, it is raised up to the reference sheet height.

On the other hand, when the sheet P progresses in the reading feeding path R2, the backside of the sheet is separated from the tip end 961 of the guide member 96 due to rigidity of the sheet P as illustrated in FIG. 4C.

Thus, the tip end 961 of the guide member 96 is positioned in the first region A1, and thus only the tip end P1 of the sheet P contacts with the tip end 961 of the guide member 96 and can be fed in the reading feeding path R2 without damaging the sheet itself and the image formed on the backside of the sheet.

To the contrary, a case in which the tip end 961 of the guide member 96 is present out of the first region A1 will be described with reference to FIG. 5A and FIG. 5B.

Figure 5A:
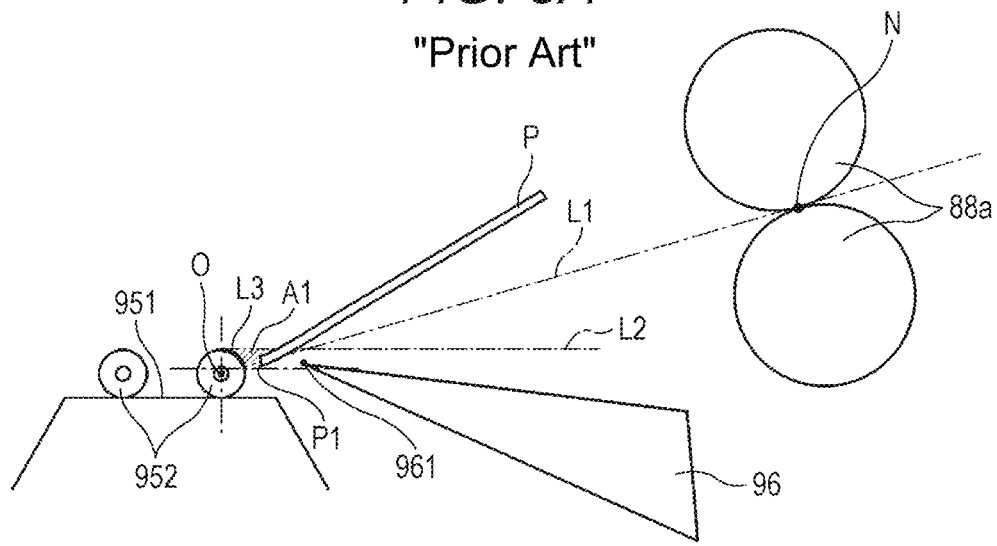
FIG. 5A and FIG. 5B are diagrams for explaining a sheet feeding state when the tip end of the guide is at an appropriate position.

FIG. 5A illustrates that the tip end 961 of the guide member 96 is positioned below the first line L1. In this case, the tip end P1 of a sheet P abuts the rollers 952 without contacting with the tip end 961 of the guide member 96, and the effects of the guide member 96 cannot obtained.

Figure 5B:
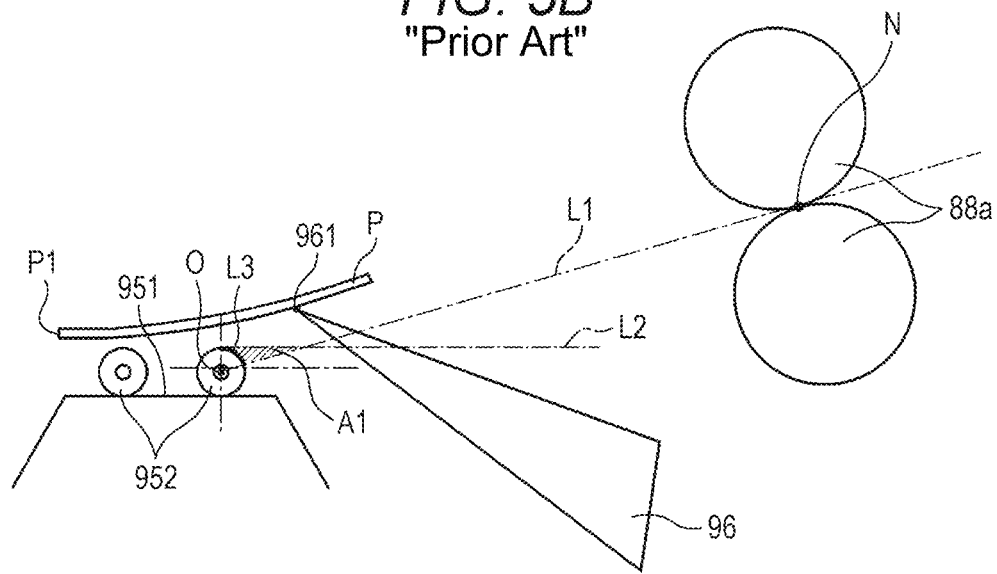

Further, FIG. 5B illustrates that the tip end 961 of the guide member 96 is positioned above the second line L2. In this case, the tip end 961 of the guide member 96 keeps contacting with the backside of a sheet P, and the image formed on the backside of the sheet is damaged, the sheet P is fed without contacting with the rollers 952, and the height of the sheet in the reading feeding path R2 cannot be uniform.

As described above, if the tip end 961 of the guide member 96 is positioned out of the first region A1, inconvenience for sheet feeding is caused, and thus the tip end 961 needs to be arranged inside the first region A1.

As described above, the reading apparatus 9 according to the first embodiment includes the opposed reading face 951 and the rollers 952, and is arranged with the guide member 96 that guides a sheet fed from the upstream feeding path R1 to the reading feeding path R2 from the opposed reading member 95 side. Thereby, when a sheet P enters the reading feeding path R2, the tip end P1 of the sheet P is raised up to the reference height by the tip end 961 of the guide member 96 and is smoothly fed in the reading feeding path R2.

At this time, the tip end 961 of the guide member 96 is positioned in the first region A1 surrounded by the line (first line L1) connecting the nip part N of the upstream feeding rollers 88a and the center O of a roller 952, the tangential line (second line L2) of the roller 952 parallel with an opposed reading face 951, and the outer periphery L3 of the roller 952. Thus, the tip end 961 of the guide member 96 contacts with only the tip end P1 of a sheet P, thereby preventing an image from being damaged due to the backside of the sheet P keeping contacting with the tip end 961.

(First Variant)

Figure 6A:
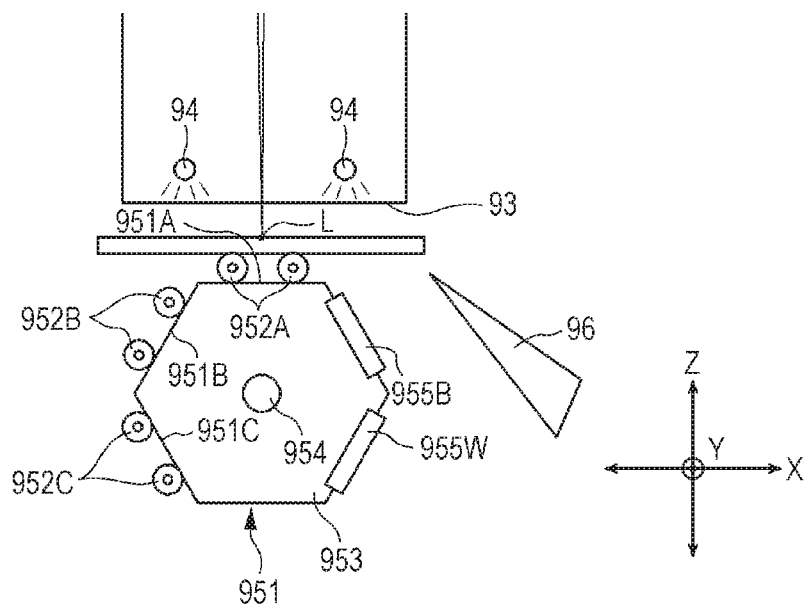
FIG. 6A and FIG. 6B are diagrams illustrating a schematic configuration of the reader according to a first variant of the first embodiment.
Figure 6B:
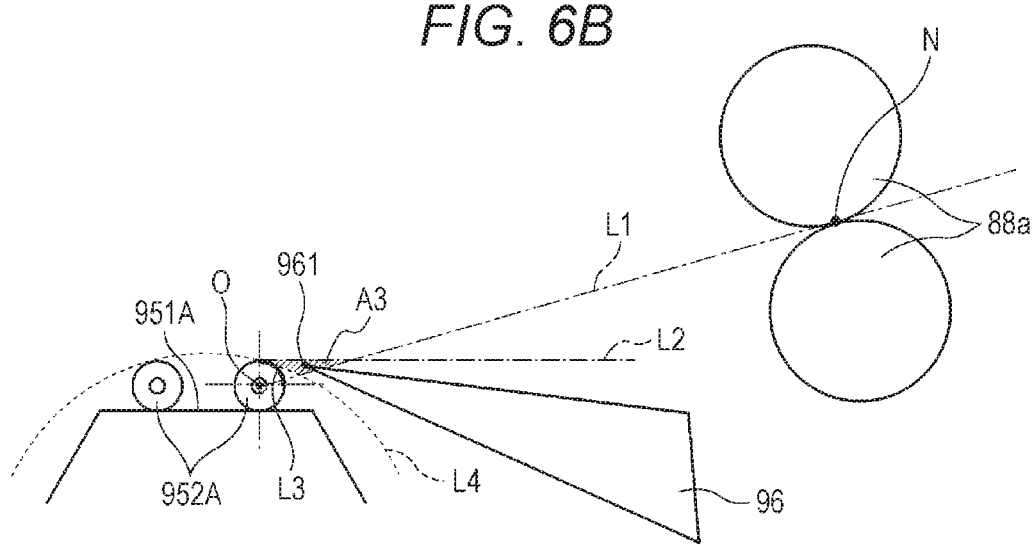
Figure 7:
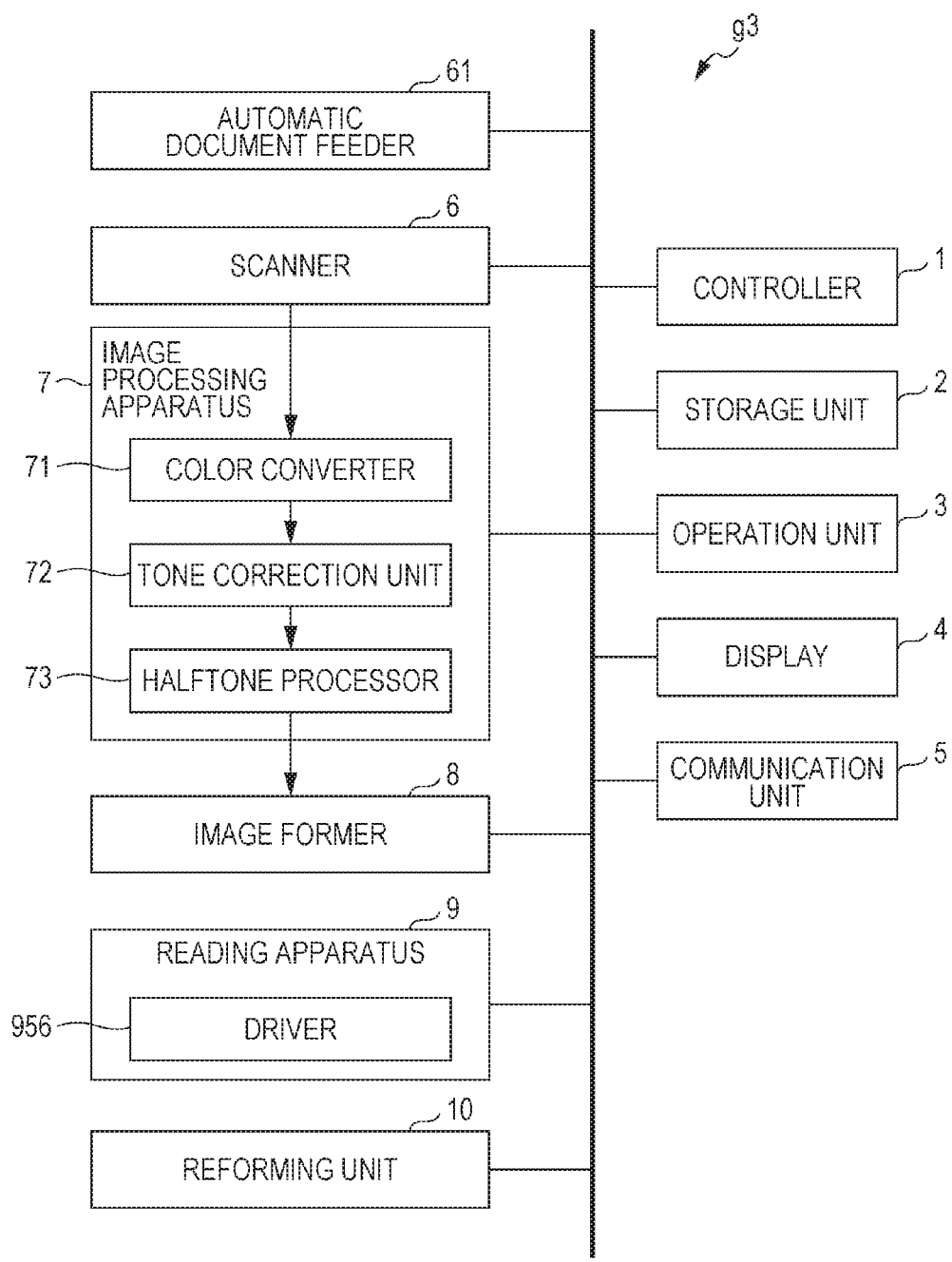
FIG. 7 is a block diagram illustrating a functional configuration of the image forming apparatus.

A first variant of the image forming apparatus G according to the first embodiment will be then described. FIG. 6A and FIG. 6B illustrate a schematic configuration of the reading apparatus 9 according to the first variant, and FIG. 7 is a block diagram illustrating a functional configuration of the image forming apparatus G according to the first variant.

As illustrated in FIG. 6A, the opposed reading member 95 according to the first variant includes a rotation shaft 954 that extends in the sheet width direction (Y direction) orthogonal to the feeding direction (X direction) of a sheet P, the hexagonal-column-shaped main body 953 that rotates about the rotation shaft 954, the opposed reading faces 951 and color correction faces 955 which are arranged on the side of the main body 953, and a driver 956 that drives and rotates the rotation shaft 954.

The rotation shaft 954 is driven to rotate by the driver 956 (see FIG. 7) including a motor or the like, and the main body 953 is rotated along with rotation of the rotation shaft 954.

The opposed reading faces 951 include opposed reading faces 951A, 951B, and 951C, and the color correction faces 955 include a white correction plate 955W and a black correction plate 955B.

The white correction plate 955W is a plate presenting white color, and is used as a standard reflecting plate when shading correction is made by the main body unit g3 as described above.

The black correction plate 955B is a plate presenting black color, and is used as a standard black plate when shading correction is made by the main body unit g3. That is, the black correction plate 955B is assumed as a background face opposite to the reading position L, and performs sampling with sensor output during no illumination as black reference.

The opposed reading faces 951A, 951B, and 951C are faces presenting different colors, respectively. Any of the opposed reading faces 951A, 951B, and 951C is assumed as a background face opposite to the reading position L during normal printing. The opposed reading face 951A is a black face and is used to read edges when shading correction is made on a document. The opposed reading face 951B is a white face and is sued to read an image (such as dragonfly) formed on a sheet, and its reading result is used to correct the image-formed position. The opposed reading face 951C is a face presenting any color, and is used when edges and image are not read, thereby preventing a contamination on the opposed reading faces 951A and 951B.

Further, for example, the opposed reading face 951C may be assumed as a face having the same color as a color component (C, M, Y, or K) used for forming an image in the image former 8 in the main body unit g3.

The opposed reading faces 951A, 951B, and 951C include pairs of rollers 952A, 952B, and 952C on the surfaces, respectively. Each of the pairs of rollers 952A, 952B, and 952C has rollers provided to be spaced at a predetermined interval on the axis extending in the Y direction similarly to the rollers 952 illustrated in FIG. 3B, and is provided to be rotatably driven while contacting with a sheet P. The ends of the rollers 952A, 952B, and 952C in the Y direction are supported by support members (not illustrated).

In the opposed reading member 95 according to the first variant, the rotation shaft 954 is rotated under control of the controller 1, and a predetermined one of the five sides of the white correction plate 955W, the black correction plate 955B, the opposed reading faces 951A, 951B, and 951C is placed to face the reading face 93. The support members provided at the ends of the rollers 952A, 952B, and 952C in the Y direction are rotated along with rotation of the main body 953.

That is, the reading feeding path R2 is formed of an opposed reading face 951 opposite to the reading face 93 out of the opposed reading faces 951, and the rollers 952. The description will be made assuming that the opposed reading face 951A is arranged to face the reading face 93.

In this case, the tip end 961 positioned at the lowermost side in the sheet feeding direction of the guide member 96 can contact with the opposed reading member 95 along with its rotation depending on a position of the tip end 961. If the surface of the member is damaged due to contact, normal sheet feeding or image reading is hindered.

Therefore, according to the first variant, the tip end 961 needs to be arranged in a region out of a maximum rotation radius of the main body 953. That is, as illustrated in FIG. 6B, the tip end 961 is arranged in a third region A3 surrounded by the line (first line L1) connecting the nip part N of the upstream feeding rollers 88a and the center O of a roller 952A, the tangential line (second line L2) of the roller 952A parallel with the opposed reading face 951A, and a maximum rotation radius L4.

As described above, the opposed reading member 95 including the opposed reading faces 951 and the color correction faces 955 is rotated about the rotation shaft 954 so that the reading apparatus 9 according to the first variant changes a face opposite to the reading face 93. At this time, the tip end 961 of the guide member 96 is arranged in the third region A3 inside the first region A1 and outside the maximum rotation radius L4 of the opposed reading member 95, thereby preventing the tip end 961 of the guide member 96 and the opposed reading member 95 from contacting with each other along with rotation of the opposed reading member 95. Therefore, the effects according to an embodiment of the present invention can be obtained also by the image forming apparatus G which is configured such that the opposed reading member 95 rotates.

Second Embodiment

A second embodiment to which the present invention is applied will be described below with reference to the drawings.

The same components as in the first embodiment are denoted with the same reference numerals, and the description thereof will be omitted.

<Sheet Feeding Mechanism in Reader>

A sheet feeding mechanism according to the second embodiment has guide rollers 962 capable of rotating in the sheet feeding direction at the tip end of the guide member 96 unlike in the first embodiment.

Figure 8A:
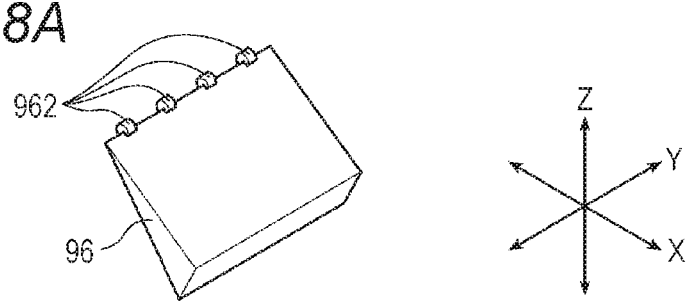
FIG. 8A to FIG. 8C are diagrams illustrating a position of a guide roller and a sheet feeding state according to a second embodiment.
Figure 8B:
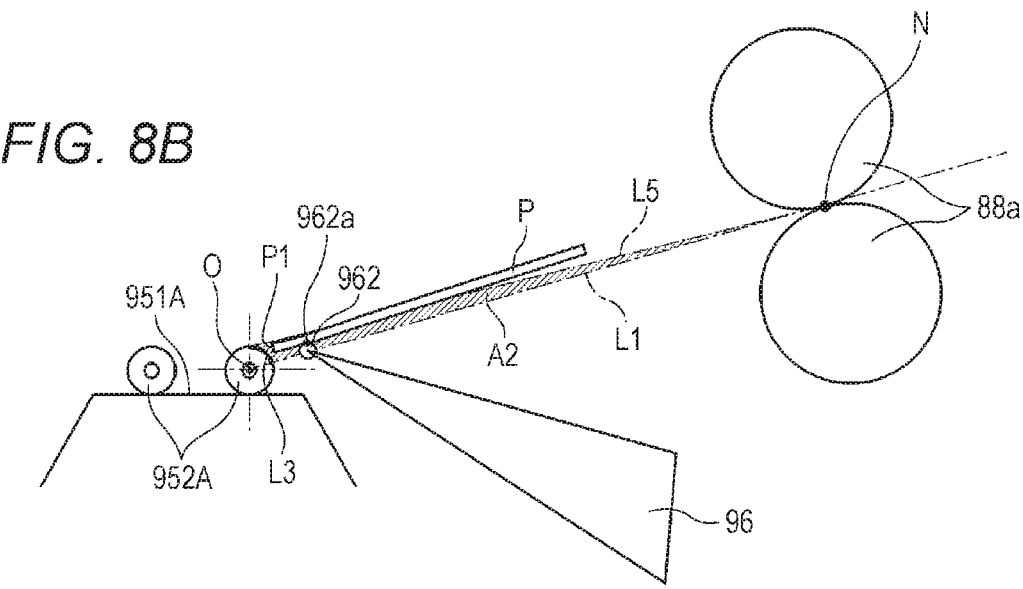
Figure 8C:
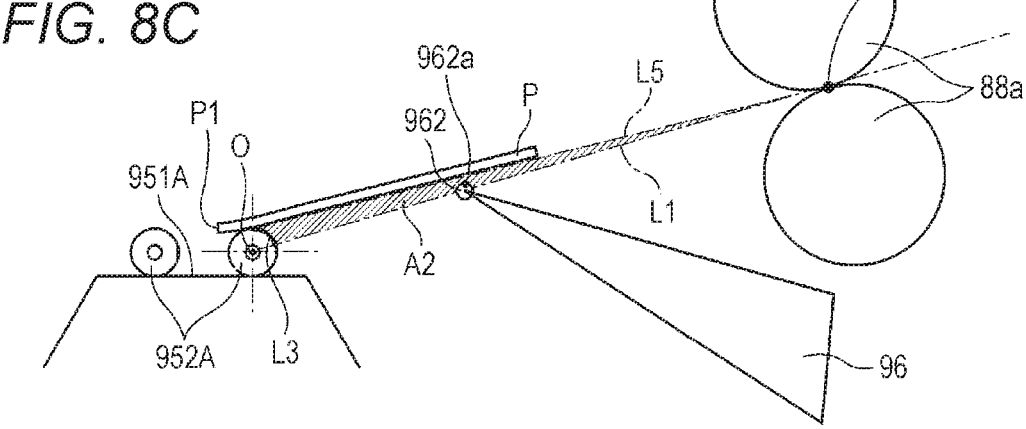

FIG. 8A to FIG. 8C are diagrams for explaining the positions of the guide rollers 962 and a sheet feeding state.

FIG. 8A illustrates a configuration of the guide member 96 according to the present embodiment.

A plurality of guide rollers 962 are provided on the tip end of the guide member 96 at predetermined intervals in the sheet feeding direction, and can rotate in the sheet feeding direction. The guide rollers 962 include bearings or the like, for example.

Thus, when a sheet is fed along the guide member 96, the guide rollers 962 rotate while an image is being fed while contacting with the guide rollers 962, and the sheet is smoothly fed, thereby more effectively preventing a damage on the image. Four guide rollers 962 are illustrated in FIG. 8A, but the number thereof is not limited.

FIG. 8B and FIG. 8C illustrate the positions of the guide rollers 962 according to the present embodiment.

As illustrated in FIG. 8B and FIG. 8C, the outer periphery including the top positions 962a of the reading face 93 in the Z direction of the guide rollers 962 is positioned in a second region A2 surrounded by the line (first line L1) connecting the nip part N of the upstream feeding rollers 88a and the center O of a roller 952A, the outer periphery L3 of the roller 952a, and a tangential line (fifth line L5) of the roller 952A passing through the nip part of the upstream feeding rollers 88a.

As illustrated in FIG. 8B, when the guide rollers 962 are positioned near the roller 952A in the second region A2 and when the tip end P1 of a sheet P enters the reading feeding path R2, the tip end P1 of the sheet P progresses to be downwardly tilted relative to the reading feeding path R2, and is raised upward by the guide rollers 962. Thereby, the tip end P1 is raised up to the reference sheet height.

On the other hand, when the sheet P progresses on the reading feeding path R2, the backside of the sheet is separated from the guide rollers 962 due to rigidity of the sheet P.

To the contrary, as illustrated in FIG. 8C, when the guide rollers 962 are positioned near the upstream feeding rollers 88a in the second region A2, the guide rollers 962 contact with the sheet P for a longer time, but friction between the guide rollers 962 and the backside of the sheet P is smaller than friction between the tip end 961 of the guide member 96 and the backside of the sheet P according to the first embodiment, which does not give a large impact.

Therefore, the guide rollers 962 are preferably positioned near the rollers 952A as illustrated in FIG. 8B, but a sheet may largely bow downwardly after passing through the upstream feeding rollers 88a due to rigidity of the sheet, and thus the guide rollers 962 may be positioned near the upstream feeding rollers 88a as illustrated in FIG. 8C in this case.

To the contrary, the description will be made assuming that the top positions 962a are positioned out of the second region A2.

When the top positions 962a are positioned below the first line L1, the tip end P1 of a sheet P does not contact with the guide rollers 962 and abuts the rollers 952A similarly as in the first embodiment, and thus the effect of the guide member 96 cannot be obtained.

Further, when the top positions 962a are positioned above the fifth line L5, a sheet P is fed without contacting with the rollers 952A similarly as in the first embodiment, and thus the height of the sheet cannot be uniform in the reading feeding path R2.

As described above, it is inconvenient that the top positions 962a are present out of the second region A2, and thus the contact points between the guide rollers 962 and a sheet need to be arranged inside the second region A2.

As described above, the guide rollers 962 are provided on the tip end of the guide member 96 in the reading apparatus 9 according to the second embodiment. Thus, it is possible to further restrict friction on the contact face with a sheet P than in the image forming apparatus G according to the first embodiment, thereby more effectively preventing a damage on a sheet and an image on the sheet.

The outer periphery including the top positions 962a is positioned in the second region A2 surrounded by the line (first line L1) connecting the nip part N of the upstream feeding rollers 88a and the center O of a roller 952A, the outer periphery L3 of the roller 952A, and the tangential line (fifth line L5) of the roller 952A passing through the nip part of the upstream feeding rollers 88a in the reading apparatus 9 according to the second embodiment. Thus, the region in which the guide member 96 can be arranged is larger than in the image forming apparatus G according to the first embodiment, and the guide member 96 can be arranged at an appropriate position depending on a type of a sheet, thereby increasing the effects of an embodiment of the present invention. In order to realize this, the guide member 96 may be provided in an arrangement changeable as need by a user operation between jobs.

(Second Variant)

A second variant of the image forming apparatus G according to the second embodiment will be then described.

Figure 9A:
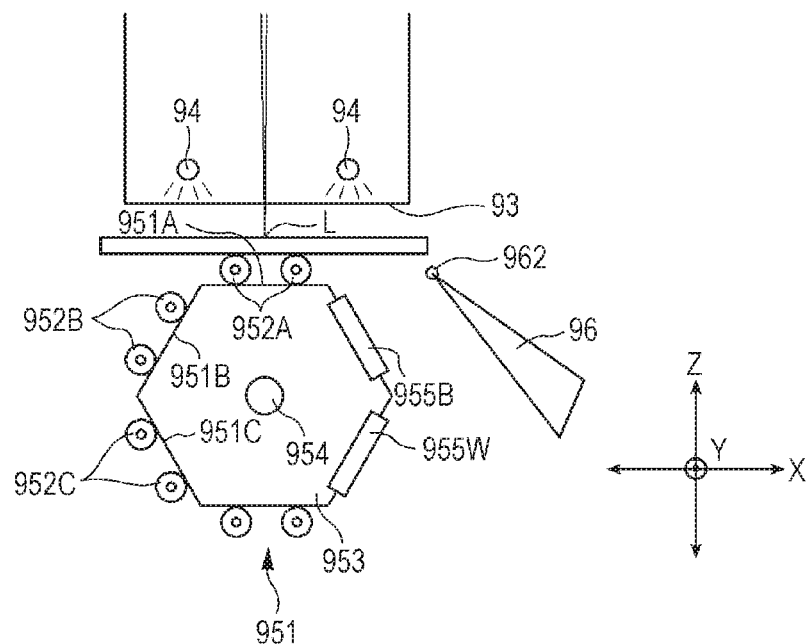
FIG. 9A and FIG. 9B are diagrams illustrating a schematic configuration of the reader according to a second variant of the second embodiment.
Figure 9B:
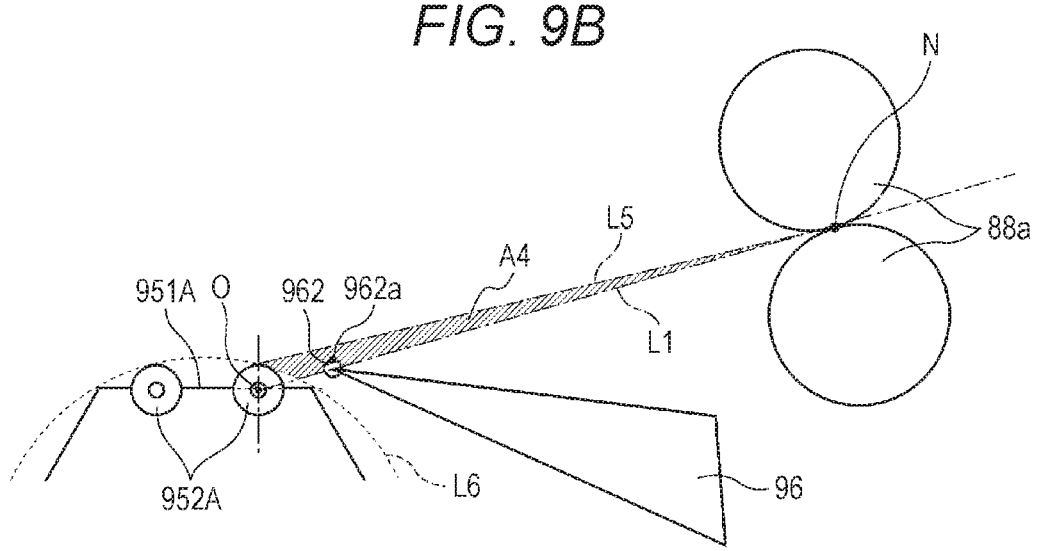

FIG. 9A and FIG. 9B illustrate a schematic configuration of the reading apparatus 9 according to the second variant. As illustrated in FIG. 9A, the opposed reading member 95 according to the second variant includes the rotation shaft 954 that extends in the width direction (Y direction) orthogonal to the feeding direction (X direction) of a sheet P, the hexagonal-column-shaped main body 953 that rotates about the rotation shaft 954, the opposed reading faces 951 and the color correction faces 955 which are arranged on the side of the main body 953, and the driver 956 that drives and rotates the rotation shaft 954 similarly as in the image forming apparatus G according to the first variant.

In this case, the guide rollers 962 positioned at the lowermost part in the sheet feeding direction of the guide member 96 can contact with the opposed reading member 95 along with their rotation depending on the positions of the guide rollers 962.

Thus, according to the second variant, the guide rollers 962 need to be arranged out of the maximum rotation radius of the main body 953. That is, as illustrated in FIG. 9B, the guide rollers 962 are positioned in a fourth region A4 surrounded by the line (first line L1) connecting the nip part N of the upstream feeding rollers 88a and the center O of a roller 952A, the tangential line (second line L2) of the roller 952A parallel with the opposed reading face 951A, and a maximum rotation radius L6.

As described above, the opposed reading member 95 including the opposed reading faces 951 and the color correction faces 955 rotates about the rotation shaft 954 so that the reading apparatus 9 according to the second variant changes a face opposite to the reading face 93. At this time, the guide rollers 962 are arranged in the fourth region A4 inside in the second region A2 and outside the maximum rotation radius L6 of the opposed reading member 95, thereby preventing the guide rollers 962 and the opposed reading member 95 from contacting with each other along with rotation of the opposed reading member 95. Thus, the effect of an embodiment of the present invention can be obtained also by the image forming apparatus G which is configured such that the opposed reading member 95 rotates.

Other Embodiment

The description has been specifically made above with reference to the embodiments according to the present invention, but the embodiments are preferable examples of the present invention and the present invention is not limited thereto.

For example, the opposed reading member 95 is assumed as a hexagonal-column-shaped member having a plurality of side faces according to the above embodiments, but is not limited thereto.

Figure 10A:
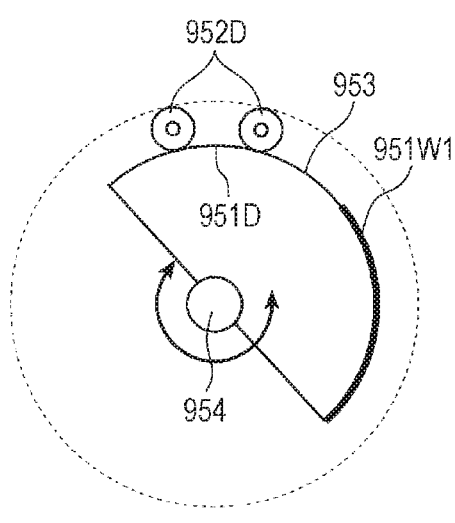
FIG. 10A and FIG. 10B are diagrams illustrating a variant of an opposed reading member.
Figure 10B:
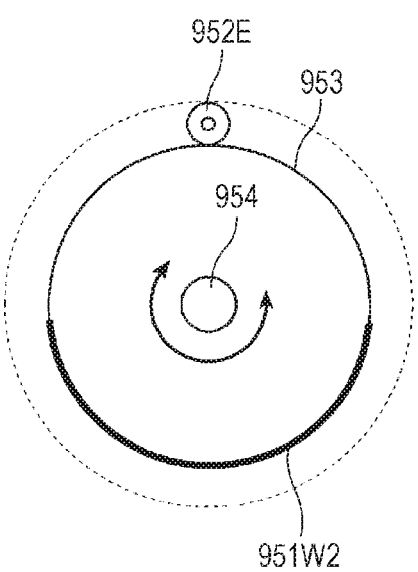

FIG. 10A and FIG. 10B illustrate a variant of the opposed reading member 95.

FIG. 10A illustrates a semicircular cross-section of the X-Z plane of the main body 953, where a pair of rollers 952D and a white correction plate 955W1 are provided on the side of the semicircle. A region between the paired rollers 952D functions as an opposed reading face 951D. The opposed reading member 95 of FIG. 10A is rotatable about the rotation shaft 954, and can make the shading correction and can read an image and the like as described above.

FIG. 10B illustrates a circular cross-section of the X-Z plane of the main body 953, where a roller 952E is provided on the side of the circle and a white correction plate 955W2 is provided on the side opposite to the roller 952E with respect to the rotation shaft 954. The opposed reading member 95 of FIG. 10B is also rotatable about the rotation shaft 954, and can make the shading correction and can read an image and the like as described above.

With the above configuration, lower cost and smaller space can be achieved than the opposed reading member 95 is column-shaped according to the above embodiments.

Further, according to the first variant and the second variant, the faces not corresponding to the opposed reading faces 951 and the color correction faces 955 in the side of the opposed reading member 95 may be provided with brushes. In this case, one brush extending in the Y direction is provided, and is moved while contacting with the reading face 93 along with rotation of the rotation shaft 954 while a sheet is not fed. Thereby, dusts and the like attached on the reading face 93 can be removed.

A brush is provided opposite to the main body 953 with respect to the rotation shaft 954 also in FIG. 10A, and thus the similar effects can be obtained.

Additionally, the detailed components of each apparatus and the detailed operations of each apparatus configuring the image forming apparatus can be changed as needed without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A reading apparatus comprising:
   a reader that reads an image formed on a sheet;
   an opposed reading member that is provided opposite to the reader;
   a first feeding path that feeds a sheet on an upstream of the reader in a sheet feeding direction;
   a second feeding path that is continuous to the first feeding path and feeds a sheet between the reader and the opposed reading member;
   a pair of feeding rollers that feeds a sheet on the first feeding path to the second feeding path;
   a guide member that guides a sheet fed from the first feeding path to the second feeding path, from the opposed reading member side; and
   a roller that is arranged on the second feeding path and is rotatably driven in a sheet feeding direction due to contact with a sheet,
   wherein the first feeding path and the second feeding path form a feeding path bent due to the different sheet feeding directions of the first feeding path and the second feeding path, and
   a downstream end of the guide member in a sheet feeding direction is positioned in a first region surrounded by a line connecting a nip part of the pair of feeding rollers and a center of the roller arranged on the second feeding path, a tangential line tangential to a surface of the roller arranged on the second feeding path and parallel with a sheet feeding direction of the second feeding path, and the outer periphery of the roller arranged on the second feeding path.

2. A reading apparatus comprising:
   a reader that reads an image formed on a sheet;
   an opposed reading member that is provided opposite to the reader;
   a first feeding path that feeds a sheet on an upstream of the reader in a sheet feeding direction;
   a second feeding path that is continuous to the first feeding path and feeds a sheet between the reader and the opposed reading member;
   a pair of feeding rollers that feeds a sheet on the first feeding path to the second feeding path;
   a guide member that guides a sheet fed from the first feeding path to the second feeding path from the opposed reading member side; and
   a roller that is arranged on the second feeding path and is rotatably driven in a sheet feeding direction due to contact with a sheet,
   wherein the first feeding path and the second feeding path form a feeding path bent due to the different sheet feeding directions of the first feeding path and the second feeding path,
   a downstream end of the guide member in a sheet feeding direction includes a guide roller capable of being rotatably driven in a sheet feeding direction due to contact with a sheet, and
   an outer periphery including a top position of the guide roller closer to the reader in a direction perpendicular to the reading face of the reader is positioned in a second region surrounded by the line connecting the nip part of the feeding rollers and the center of the roller arranged on the second feeding path, a tangential line tangential to a surface of the roller arranged on the second feeding path and passing through the nip part of the feeding rollers, and the outer periphery of the roller arranged on the second feeding path.

3. The reading apparatus according to claim 1, further comprising:
   a driver that integrally rotates the opposed reading member and the roller about a rotation shaft extending in a sheet width direction perpendicular to a sheet feeding direction; and
   a color correction face that is provided on a side of the opposed reading member and can face the reader when the opposed reading member rotates about the rotation shaft.

4. The reading apparatus according to claim 1, further comprising:
   a driver that integrally rotates the opposed reading member and the roller about a rotation shaft extending in a sheet width direction perpendicular to a sheet feeding direction; and
   a color correction face that is provided on a side of the opposed reading member and can face the reader when the opposed reading member rotates about the rotation shaft,
   wherein the downstream end of the guide member in a sheet feeding direction is positioned in a third region inside the first region and outside a maximum rotation radius of the opposed reading member.

5. The reading apparatus according to claim 2, further comprising:
   a driver that integrally rotates the opposed reading member and the roller about a rotation shaft extending in a sheet width direction perpendicular to a sheet feeding direction; and
   a color correction face that is provided on a side of the opposed reading member and can face the reader when the opposed reading member rotates about the rotation shaft,
   wherein the guide roller is positioned in a fourth region inside the second region and outside a maximum rotation radius of the opposed reading member.

6. The reading apparatus according to claim 1, further comprising:
   a driver that rotates the opposed reading member about a rotation shaft extending in a direction perpendicular to a sheet feeding direction of a sheet face;
   a plurality of opposed reading faces that are provided on a side of the opposed reading member and can face the reader when the opposed reading member rotates about the rotation shaft;
   a plurality of color correction faces that are provided on the side of the opposed reading member and can face the reader when the opposed reading member rotates about the rotation shaft; and
   rollers that are arranged on the respective surfaces of the opposed reading faces, are rotatably driven in a sheet feeding direction due to contact with a sheet, and integrally rotate with the opposed reading member about the rotation shaft.

7. An image forming apparatus comprising:
an image former that forms an image on a sheet; and
the reading apparatus according to claim 1.

8. The reading apparatus according to claim 2, further comprising:
a driver that integrally rotates the opposed reading member and the roller about a rotation shaft extending in a sheet width direction perpendicular to a sheet feeding direction; and
a color correction face that is provided on a side of the opposed reading member and can face the reader when the opposed reading member rotates about the rotation shaft.

9. The reading apparatus according to claim 2, further comprising:
a driver that rotates the opposed reading member about a rotation shaft extending in a direction perpendicular to a sheet feeding direction of a sheet face;
a plurality of opposed reading faces that are provided on a side of the opposed reading member and can face the reader when the opposed reading member rotates about the rotation shaft;
a plurality of color correction faces that are provided on the side of the opposed reading member and can face the reader when the opposed reading member rotates about the rotation shaft; and
rollers that are arranged on the respective surfaces of the opposed reading faces, are rotatably driven in a sheet feeding direction due to contact with a sheet, and integrally rotate with the opposed reading member about the rotation shaft.

10. An image forming apparatus comprising:
an image former that forms an image on a sheet; and
the reading apparatus according to claim 2.

* * * * *